United States Patent
Itou (10) Patent No.: US 10,605,639 B2
(45) Date of Patent: Mar. 31, 2020

(54) FLOW RATE MEASURING DEVICE

(71) Applicant: DENSO CORPORATION, Kariya, Aichi-pref. (JP)

(72) Inventor: Kengo Itou, Kariya (JP)

(73) Assignee: DENSO CORPORATION, Kariya (JP)

( * ) Notice: Subject to any disclaimer, the term of this patent is extended or adjusted under 35 U.S.C. 154(b) by 126 days.

(21) Appl. No.: 15/073,747

(22) Filed: Mar. 18, 2016

(65) Prior Publication Data

US 2016/0282161 A1 Sep. 29, 2016

(30) Foreign Application Priority Data

Mar. 23, 2015 (JP) .................................. 2015-059215

(51) Int. Cl.
*G01F 1/684* (2006.01)
*G01F 1/692* (2006.01)

(52) U.S. Cl.
CPC ............ *G01F 1/6842* (2013.01); *G01F 1/692* (2013.01)

(58) Field of Classification Search
CPC ................................ G01F 1/6824; G01F 15/00
USPC .............. 73/204.22, 114.32, 273, 202, 202.5
See application file for complete search history.

(56) References Cited

U.S. PATENT DOCUMENTS

| | | | | |
|---|---|---|---|---|
| 4,562,745 A * | 1/1986 | Parra | ..................... | G01F 1/3245 73/861.22 |
| 4,776,213 A * | 10/1988 | Blechinger | ........... | G01F 1/6842 73/114.34 |
| 5,756,893 A | 5/1998 | Kondo et al. | | |
| 6,701,781 B1 * | 3/2004 | Lutowsky, Jr. | ........ | G01F 1/6842 73/204.25 |
| 7,370,526 B1 * | 5/2008 | Ice | .......................... | G01K 13/02 374/135 |
| 8,418,548 B2 * | 4/2013 | Konzelmann | .......... | G01F 1/6842 73/114.32 |
| 8,517,604 B2 * | 8/2013 | Parsons | ................ | G01K 13/028 374/158 |
| 8,806,934 B2 * | 8/2014 | Goedel | ................ | G01K 13/028 73/204.22 |
| 2013/0019675 A1 * | 1/2013 | Ban | ........................... | G01F 5/00 73/202 |
| 2013/0028288 A1 * | 1/2013 | Ooga | ...................... | G01K 13/02 374/142 |
| 2015/0168191 A1 | 6/2015 | Morino et al. | | |

FOREIGN PATENT DOCUMENTS

| | | |
|---|---|---|
| JP | H08-29225 | 2/1996 |
| JP | H08-297039 A | 11/1996 |

* cited by examiner

*Primary Examiner* — Nimeshkumar D Patel
*Assistant Examiner* — Jean F Morello

(57) ABSTRACT

A flow rate measuring device includes a housing having a cross-section perpendicular to a Y-direction and taken at a position of an outlet of the housing. The cross-section includes a widest portion having a maximum width along a Z-direction. The cross-section has a width gradually decreasing from the widest portion toward an upstream side end and has a width gradually decreasing from the widest portion toward a downstream side end. A width of the housing at a middle position of the housing in an upstream area is defined as a width W1. A width at a middle position in a downstream area is defined as a width W2. A length of the housing in the upstream area is defined as a length L1. A length in the downstream area is defined as a length L2. W1>W2 and W1/L1>W2/L2.

12 Claims, 5 Drawing Sheets

FLOW RATE MEASURING DEVICE

CROSS REFERENCE TO RELATED APPLICATION

This application is based on and incorporates herein by reference Japanese Patent Application No. 2015-059215 filed on Mar. 23, 2015.

TECHNICAL FIELD

The present disclosure relates to a flow rate measuring device, which includes a bypass passage taking in a portion of an air flowing in a duct and measures a flow rate of the air by a flow rate sensor disposed in the bypass passage.

BACKGROUND

Conventionally, a device has been known as a flow rate measuring device that includes a housing defining a bypass passage therein to take in a portion of an air (main flow) flowing in a duct, and a flow rate sensor disposed in the bypass passage.

For example, Patent Document 1 (JP H8-297039 A) discloses a flow rate measuring device in which an outlet of a bypass passage is open at an outer wall of a housing, and the housing has an oval shape. An outline of the housing disclosed in Patent Document 1 includes a portion (widest portion), which is widest in the outline, at a middle of the housing in a direction of the main flow. The outline is symmetrical about the widest portion.

Since a rate of the main flow is accelerated in an upstream area of the widest portion, a separation of the air is unlikely to occur. Since a rate of the main flow is decreased in a downstream area of the widest portion, the separation of the air may be likely to occur. Hence, when both the upstream area and the downstream area where the likelihood of occurrence of the separation is different have a same shape, it may be difficult to reduce the separation in the downstream area.

Especially, when the outlet of the bypass passage is open at the outer wall of the housing, and when an eddy is generated due to the separation at a downstream area of an airflow near the outlet, the eddy may negatively affect a flow in the bypass passage, and whereby a detection accuracy of the flow rate sensor in the bypass passage may be deteriorated.

SUMMARY

It is an objective of the present disclosure to provide a flow rate measuring device that reduces a separation of a flow of an air flowing in a duct along a housing.

According to a first aspect of the present disclosure, a flow rate measuring device includes a housing disposed in a duct to protrude into an inside of the duct from an outside of the duct through which an air as a measuring target flows. The housing defines a bypass passage therein to take in a portion of the air flowing in the duct. An outlet of the bypass passage is open at an outer wall of the housing. The flow rate measuring device includes a flow rate sensor disposed in the bypass passage. A direction in which the air flows in the duct is defined as an X-direction, a direction in which the housing protrudes is defined as a Y-direction, and a direction perpendicular to both the X-direction and the Y-direction is defined as a Z-direction. The housing has a cross-section that is perpendicular to the Y-direction and that is taken at a position of the outlet. The cross-section includes a widest portion, between an upstream side end and a downstream side end, having a maximum width along the Z-direction. The cross-section has a width along the Z-direction gradually decreasing from the widest portion toward the upstream side end and has a width along the Z-direction gradually decreasing from the widest portion toward the downstream side end. A width of the housing along the Z-direction at a middle position of the housing between the widest portion and the upstream side end in the X-direction is defined as a width W1. A width of the housing along the Z-direction at a middle position of the housing between the widest portion and the downstream side end in the X-direction is defined as a width W2. A length of the housing along the X-direction between the widest portion and the upstream side end is defined as a length L1. A length of the housing along the X-direction between the widest portion and the downstream side end is defined as a length L2. W1>W2 and W1/L1>W2/L2.

According to a second aspect of the present disclosure, a flow rate measuring device includes a housing disposed in a duct to extend in a direction inside the duct through which an air flows. The housing defines a bypass passage therein to take in a portion of the air flowing in the duct. An outlet of the bypass passage is open at an outer wall of the housing. A direction in which the air flows in the duct is defined as an X-direction, a direction in which the housing extends is defined as a Y-direction, and a direction perpendicular to both the X-direction and the Y-direction is defined as a Z-direction. The housing has a cross-section that is parallel to both the X-direction and the Z-direction and that is taken at a position of the outlet. The cross-section includes a widest portion, between an upstream side end and a downstream side end, having a maximum width along the Z-direction. The cross-section has a width along the Z-direction gradually decreasing from the widest portion toward the upstream side end and has a width along the Z-direction gradually decreasing from the widest portion toward the downstream side end. A width of the housing along the Z-direction at a middle position of the housing in the X-direction between the widest portion and the upstream side end is defined as a width W1. A width of the housing along the Z-direction at a middle position of the housing in the X-direction between the widest portion and the downstream side end is defined as a width W2. A length of the housing along the X-direction between the widest portion and the upstream side end is defined as a length L1. A length of the housing along the X-direction between the widest portion and the downstream side end is defined as a length L2. W1>W2 and W1/L1>W2/L2.

According to these aspects, the housing has a downstream area downstream of the widest portion and an upstream area upstream of the widest portion, and a decrease rate of the housing in the width of the downstream area from the widest portion to the downstream side end is less than that of the upstream area from the widest portion to the upstream side end. Therefore, a flow rate of the air decreases, and a separation of the air unlikely occurs. In other words, generation of the separation of the air flowing through the duct along the housing can be suppressed.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A configuration of a flow rate measuring device 1 according to a first embodiment will be described referring to FIGS. 1 to 5. The flow rate measuring device 1 is an airflow meter, for example, that measures an amount of an intake air drawn into an engine for a vehicle. The flow rate measuring device 1 is attached to a duct D that defines an intake passage sending the intake air to the engine for a vehicle. An attachment hole Da is open at a wall of the duct D, and the flow rate measuring device 1 is inserted into the duct D through the attachment hole Da.

The flow rate measuring device 1 includes an engagement portion 2, a housing 3, a flow rate sensor 4 and so on.

Figure 1:
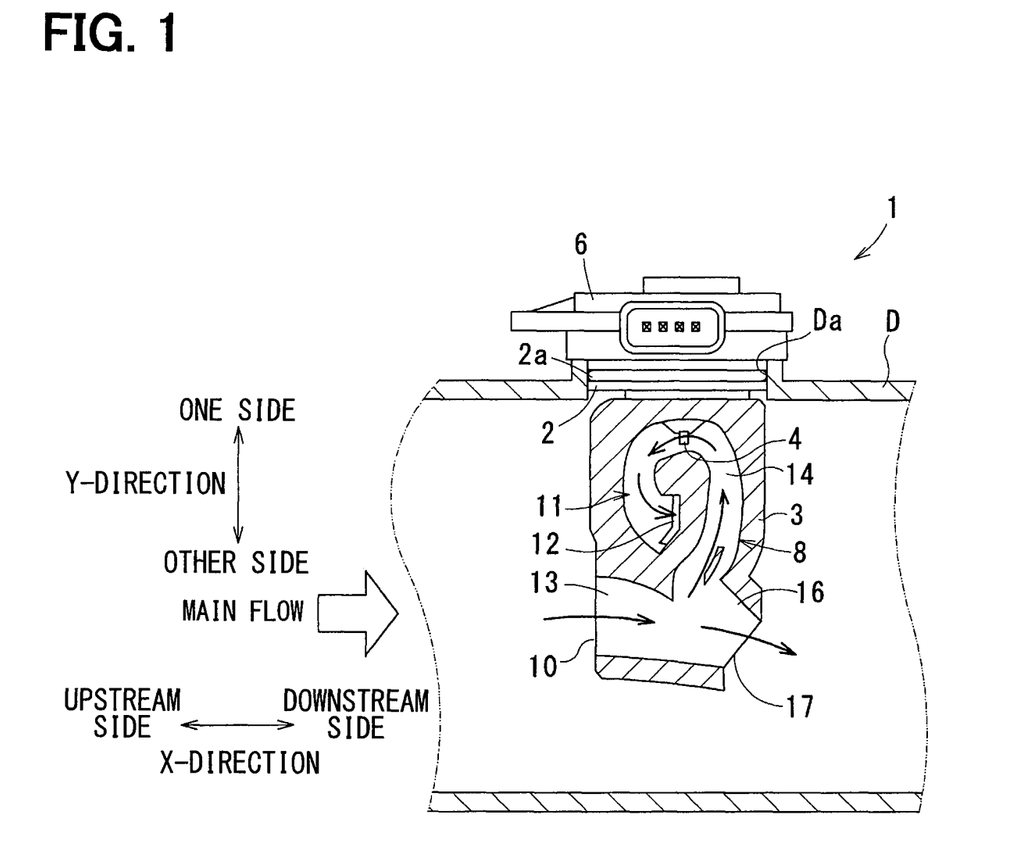
FIG. 1 is a partially cross-sectional diagram illustrating a flow rate measuring device according to a first embodiment of the present disclosure.
Figure 2:
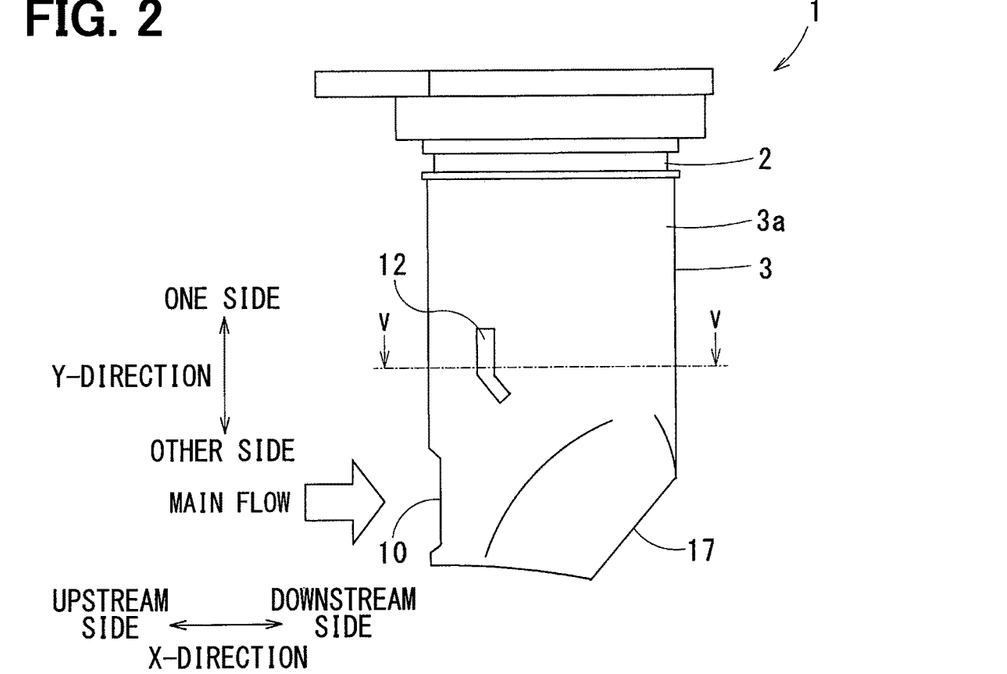
FIG. 2 is a plan diagram illustrating the flow rate measuring device when the flow rate measuring device is viewed from the other side in a Z-direction, according to the first embodiment.
Figure 3:
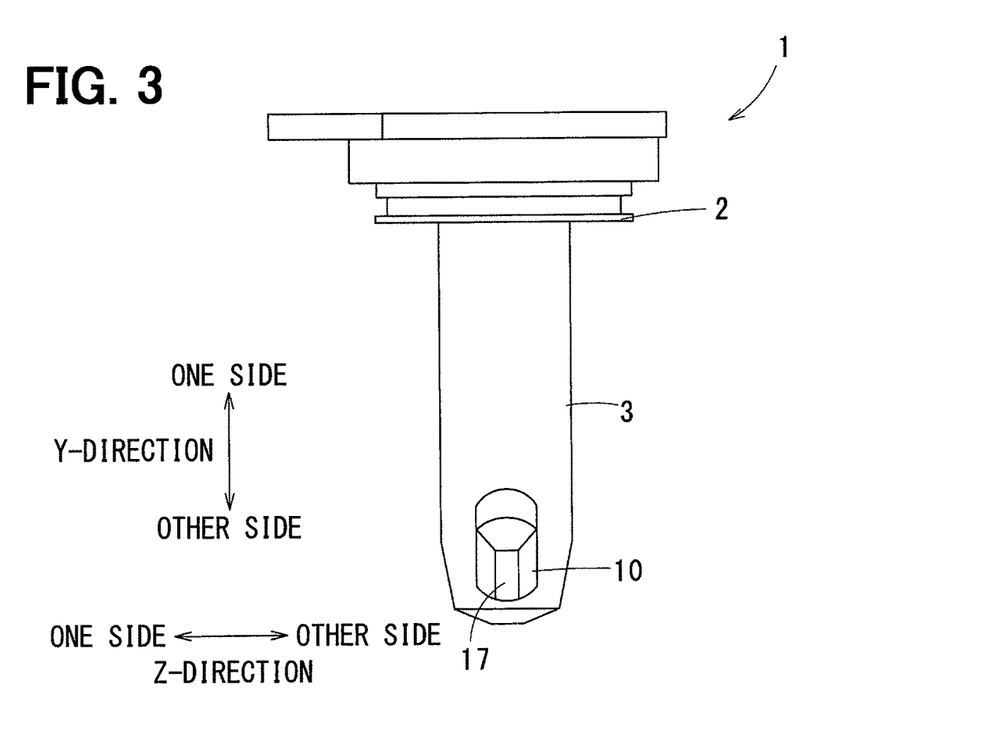
FIG. 3 is a plan diagram illustrating the flow rate measuring device when the flow rate measuring device is viewed from an upstream side in an X-direction, according to the first embodiment.
Figure 4:
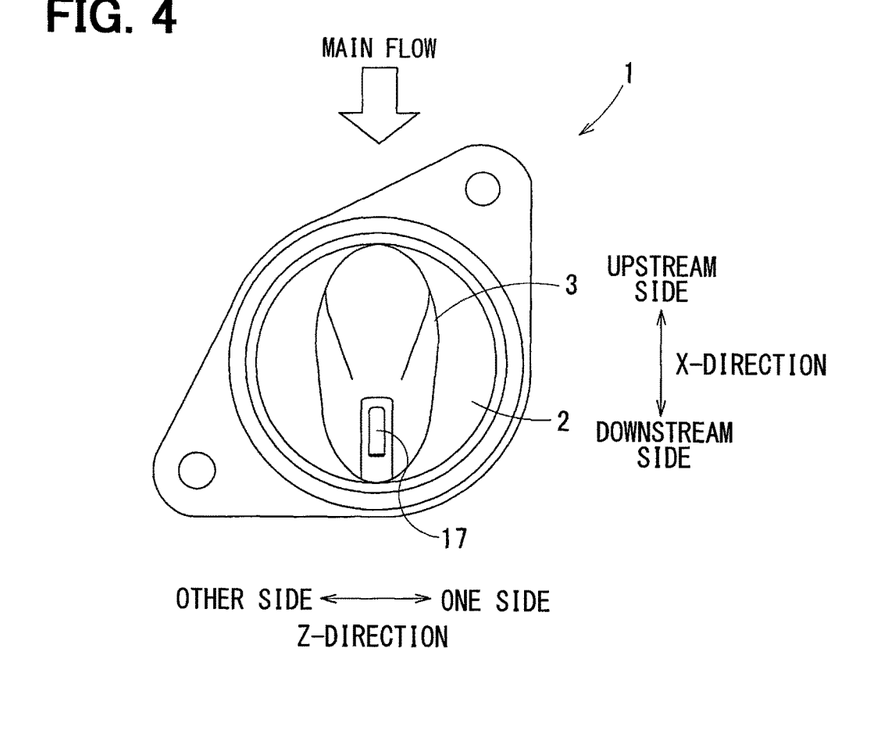
FIG. 4 is a plan diagram illustrating the flow rate measuring device when the flow rate measuring device is viewed from the other side in a Y-direction, according to the first embodiment.

The engagement portion 2 is engaged with the attachment hole Da and includes an outer peripheral surface facing an inner peripheral surface of the attachment hole Da. The outer peripheral surface includes a circumferential groove, as shown in FIG. 2. A gap between the inner peripheral surface of the attachment hole Da and the outer peripheral surface of the engagement portion 2 is sealed by an O-ring 2a disposed in the circumferential groove, as shown in FIG. 1.

The housing 3 protrudes, into an inside of the duct D, in a direction (the radial direction of the duct D) approximately perpendicular to a flow direction (a direction of a main flow) of an air in the attachment hole Da. However, the direction, in which the housing 3 protrudes, may not be perpendicular to the flow direction. A portion of the flow rate measuring device 1 protruding from the engagement portion 2 to an outside of the duct D includes a connector 6. Hereinafter, the direction of the main flow is referred to as an X-direction, a direction in which the housing 3 protrudes is referred to as a Y-direction, and a direction perpendicular to the X-direction and the Y-direction is referred to as a Z-direction.

The housing 3 protrudes from a portion of the duct D close to a wall of the duct D toward an axial center of the duct D, and the housing 3 defines a bypass passage 8 therein to take in a part of the air flowing in the duct D. The bypass passage 8 includes an inlet 10 through which a portion of the air flowing in the duct D flows, an inner passage 11 in which the air passing through the inlet 10 flows, and an outlet 12 that returns the air introduced into the bypass passage 8 to the air flowing in the duct D.

The inner passage 11 includes an intake passage 13 extending from the inlet 10 toward a downstream side of the duct D, and a circulation passage 14 that revolves a fluid (air) and guides the air to the outlet 12.

The intake passage 13 branches into two branched passages. One branched passage is connected to the circulation passage 14, and the other branched passage is connected to a dust discharge passage 16. The dust discharge passage 16 is a passage for discharging a dust contained in the air introduced from the inlet 10 by allowing the dust to path through the housing 3. A fluid, which has passed through the intake passage 13 and flows in the dust discharge passage 16, flows approximately parallel to the main flow. A downstream end of the dust discharge passage 16 defines a dust discharge opening 17.

The circulation passage 14 guides the fluid flowing from the intake passage 13 toward one side in the Y-direction (a radially outside of the duct D, toward the engagement portion 2), and then guides the fluid toward an upstream side of the main flow, i.e. an opposite direction in which the air flowing in the intake passage 13. Subsequently, the circulation passage 14 guides the fluid toward the other side in the Y-direction, and then guides the fluid toward a downstream side of the main flow and guides the fluid to the outlet 12.

The outlet 12 is open on an outer wall 3a of the housing 3. Therefore, a discharge of the fluid from the outlet 12 is promoted due to a Venturi effect by using the main flow passing in front of the outlet 12.

The flow rate sensor 4 outputs an electric signal (e.g. voltage signal) according to a flow rate of the air flowing in the bypass passage 8. Specifically, the flow rate sensor 4 includes a heating element and a thermosensitive element, which are formed of thin film resistors, on a membrane disposed on a semiconductor substrate. The elements are connected to a substrate housed within a circuit module. The flow rate sensor 4 is housed in a portion of the circulation passage 14 in which the fluid flows in a direction opposite to the direction of the main flow. The flow rate sensor 4 disposed in the circulation passage 14 detects the flow rate.

Figure 5:
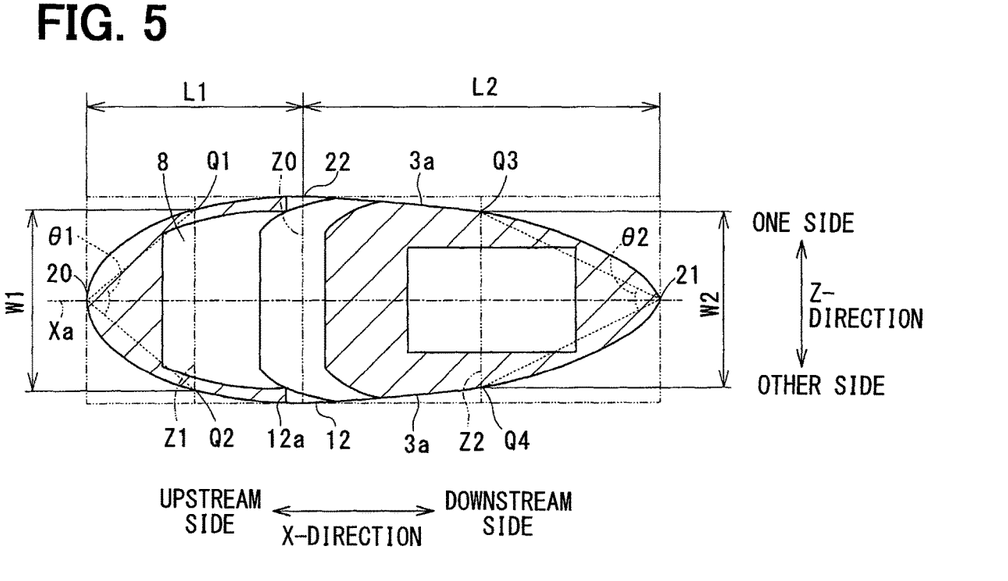
FIG. 5 is a cross-sectional diagram illustrating the flow rate measuring device taken along a line V-V of FIG. 2 according to the first embodiment.

FIG. 5 shows a cross-section of the housing 3 perpendicular to the Y-direction taken at a position of the outlet 12. In this embodiment, the cross-section is parallel to both the X-direction and the Z-direction. Any cross-sections at any positions within a range in the Y-direction where the outlet 12 exists have the same shape as described below.

In the cross-section, an end portion on an upstream side in the X-direction is defined as an upstream side end 20, and an end portion on a downstream side is defined as a downstream side end 21. In the present embodiment, the upstream side end 20 and the downstream side end 21 are on an imaginary line Xa parallel to the X-direction. One side of the cross-section in the Z-direction with respect to the imaginary line Xa has a shape symmetrical to that of the other side. The outlet 12 is open on both the one side and the other side of the outer wall 3a in the Z-direction. The main flow flows along the outer wall 3a.

The cross-section includes a widest portion 22 between the upstream side end 20 and the downstream side end 21. The widest portion 22 has a maximum width along the Z-direction. A width of the cross-section along the Z-direction gradually decreases from the widest portion 22 toward the upstream side end 20. Also, the width of the cross-section along the Z-direction gradually decreases from the widest portion 22 toward the downstream side end 21. Therefore, a projected area of a portion of the housing 3 including the outlet 12 and projected in the direction of the main flow gradually increases from the upstream side end 20 toward the widest portion 22, and the projected area decreases from the widest portion 22 toward the downstream side end 21.

In the present embodiment, an outline of the cross-section are formed of a plurality of curves that are continuously connected to each other and are convex radially outward of the housing 3. In other words, both the outer wall 3a on the one side of the housing 3 in the Z-direction and the outer wall 3a on the other side of the housing 3 in the Z-direction are defined by the plurality of continuous curves and each of the plurality of continuous curves is gently inclined with respect to the imaginary line Xa.

A width of the housing 3 along the Z-direction, at a middle position in the X-direction between the widest portion 22 and the upstream side end 20, is defined as a width W1. A width of the housing 3 along the Z-direction of the housing 3, at a middle position in the X-direction between the widest portion 22 and the downstream side end 21, is defined as a width W2. A length of the housing 3 along the X-direction from the widest portion 22 to the upstream side end 20 is defined as a length L1. A length of the housing 3 along the X-direction from the widest portion 22 to the downstream side end 21 is defined as a length L2. Then, W1>W2 and W1/L1>W2/L2.

Moreover, L2>L1.

An upstream end 12a of the outlet 12 is positioned upstream of the widest portion 22 in the X-direction. In the present embodiment, the outlet 12 is open in a particular region of the housing 3 from a portion upstream of the widest portion 22 to a portion downstream of the widest portion 22.

As shown in FIG. 5, an imaginary line representing a position of the widest portion 22 in the X-direction is defined as an imaginary line Z0. If the widest portion 22 extends in a predetermined area along the X-direction, the imaginary line Z0 would be a line passing a middle position of the predetermined area in the X-direction.

Here, an area of the cross-section upstream of the imaginary line Z0 is referred to as an upstream area. An imaginary line extending along the Z-direction and representing a middle position of the upstream area in the X-direction is referred to as an imaginary line Z1.

An area of the cross-section downstream of the imaginary line Z0 is referred to as a downstream area. An imaginary line extending along the Z-direction and representing a middle position of the downstream area in the X-direction is referred to as an imaginary line Z2.

A point at which the imaginary line Z1 intersects with the outer wall 3a of the housing 3 on the one side in the Z-direction is defined as an intersection Q1. A point at which the imaginary line Z1 intersects with the outer wall 3a of the housing 3 on the other side in the Z-direction is defined as an intersection Q2. A point at which the imaginary line Z2 intersects with the outer wall 3a of the housing 3 on the one side in the Z-direction is defined as an intersection Q3. A point at which the imaginary line Z2 intersects with the outer wall 3a of the housing 3 on the one side in the Z-direction is defined as an intersection Q4.

Since W1/(L1/2) represents an average gradient of the outer wall 3a between the upstream side end 20 and the intersection Q1 or the intersection Q2, W1/L1 represents a degree of a gradient (increase rate of width) of the outer wall 3a between the upstream side end 20 and the intersection Q1 or the intersection Q2. Since W2/(L2/2) represents an average gradient of the outer wall 3a between the downstream side end 21 and the intersection Q3 or the intersection Q4, W2/L2 represents a degree of a gradient (increase rate of width) of the outer wall 3a between the downstream side end 21 and the intersection Q3 or the intersection Q4.

In the present embodiment, since W1/L1>W2/L2, the increase rate of width in the downstream area is smaller than the increase rate of width in the upstream area. The cross-section has a teardrop shape in which the downstream side end 21 is thinner than the upstream side end 20.

In other words, a point angle θ2 in the downstream area is smaller than a point angle θ1 in the upstream area. The point angle θ1 is an angle between a line from the intersection Q1 to the upstream side end 20 and a line from the intersection Q2 to the upstream side end 20. The point angle θ2 is an angle between a line from the intersection Q3 to the downstream side end 21 and a line from the intersection Q4 to the downstream side end 21.

In the present embodiment, the length L2 is longer than the length L1. In other words, a dimension of the downstream area along the X-direction is larger than a dimension of the upstream area along the X-direction.

In the present embodiment, the upstream end 12a of the outlet 12 is located upstream of the widest portion 22 in the X-direction. In other words, a position of the upstream end 12a is located upstream of the imaginary line Z0.

In the flow rate measuring device 1 of the present embodiment, the cross-section of the housing 3 perpendicular to the Y-direction taken at a position of the outlet 12 satisfies relationships, W1>W2 and W1/L1>W2/L2. Therefore, the projected area of the housing 3 downstream of the widest portion 22 projected in the direction of the main flow changes gently compared to the projected area on the upstream side. Since an increase rate of a gradient, with respect to the direction of the main flow, of the outer wall 3a of the downstream area from the widest portion 22 toward the downstream side end 21 can be gentle as compared to an increase rate of a gradient of the upstream area from the widest portion 22 toward the upstream side end 20, a separation of a fluid can become unlikely to occur even when a flow rate of the fluid decreases.

Figure 6:
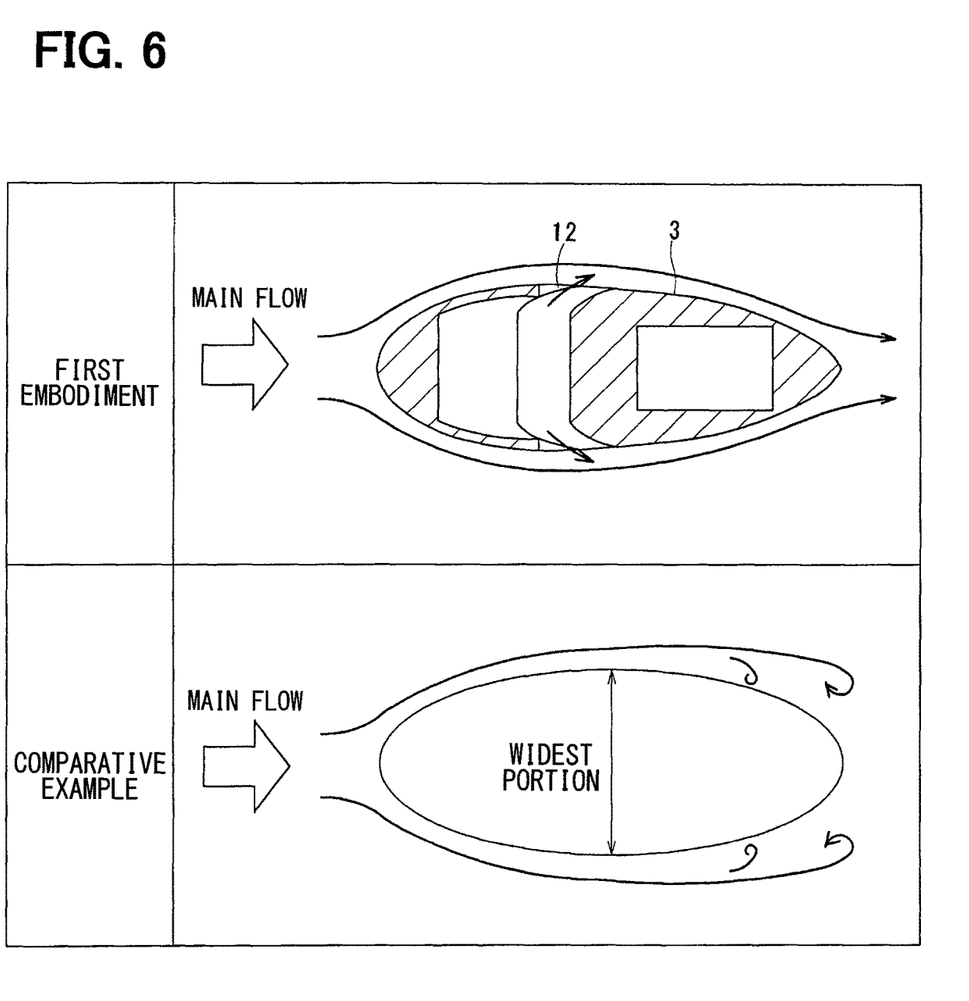
FIG. 6 is a diagram for explaining an effect of the first embodiment.

As shown in FIG. 6, in the present embodiment, the main flow is likely to flow along the housing 3, especially in the downstream area, as compared to a comparative example, and thus generation of the separation of the fluid can be suppressed. Accordingly, occurrence of an eddy in the downstream area can be limited.

In the comparative example, although an acceleration effect for air can be obtained at the upstream area, a gradient in the downstream area is similar to a gradient in the upstream area. Therefore, a change of a projected area of the housing 3 in the downstream area projected in the direction of the main flow may be greater than that of the present embodiment. In other words, a decrease rate in the width of the downstream area from the widest portion 22 toward the downstream side end 21 according to the comparative example is greater than that of the present embodiment. Accordingly, since a rate of the main flow flowing along the housing 3 in the downstream area of the comparative example is slow. Moreover, the change of the projected area in the downstream area may be bigger. Therefore, a separation of a fluid may be likely to occur.

Since the occurrence of the eddy due to separation can be limited in the present embodiment, the eddy does not affect the flow in the bypass passage 8, and thus a detection accuracy of the flow rate sensor 4 can be increased.

In the present embodiment, L1 and L2 are set as L2>L1. Accordingly, the gradient, with respect to the main flow, of the outer wall 3a in the downstream area can be gentle easily.

The upstream end 12a of the outlet 12 is located upstream of the widest portion 22 in the X-direction, and a rate of the main flow in the upstream area flowing along the outer wall 3a is accelerated and flows fast. Accordingly, since the upstream end 12a of the outlet 12 is included in the upstream area, a Venturi effect can be used effectively.

A portion of the outer wall 3a close to the outlet 12 is under a circumstance where the separation of the fluid is likely to occur due to a junction of a flow from the outlet 12 and the main flow. However, since the outlet 12 is positioned in the upstream area, in which the rate of the main flow is high and the separation is unlikely to occur, occurrence of the separation due to the junction of the flows can be suppressed.

(Second Embodiment)

Figure 7:
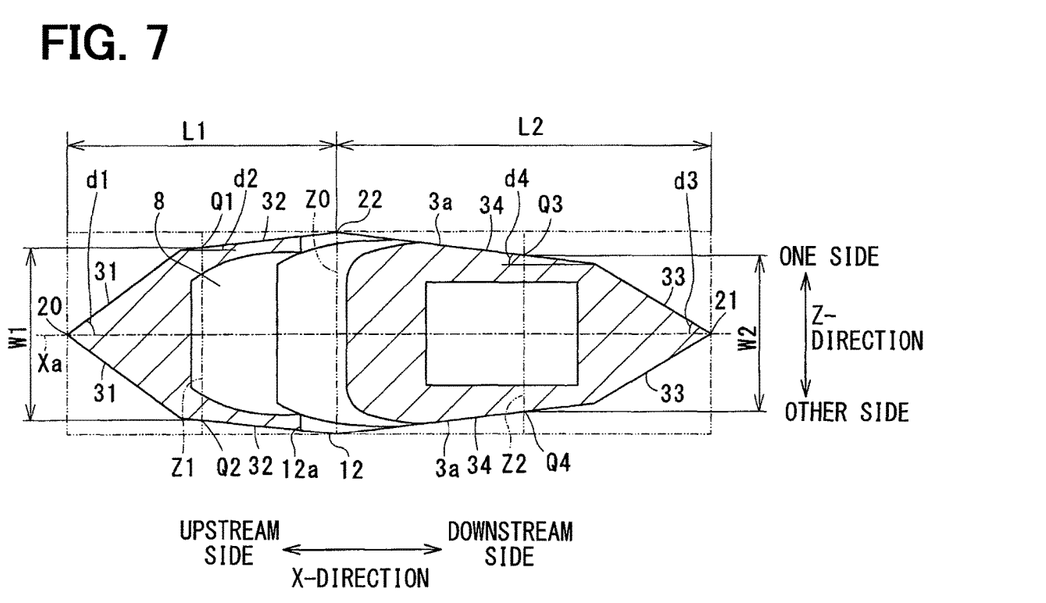
FIG. 7 is a cross-sectional diagram illustrating a flow measurement device according to a second embodiment.
Figure 8:
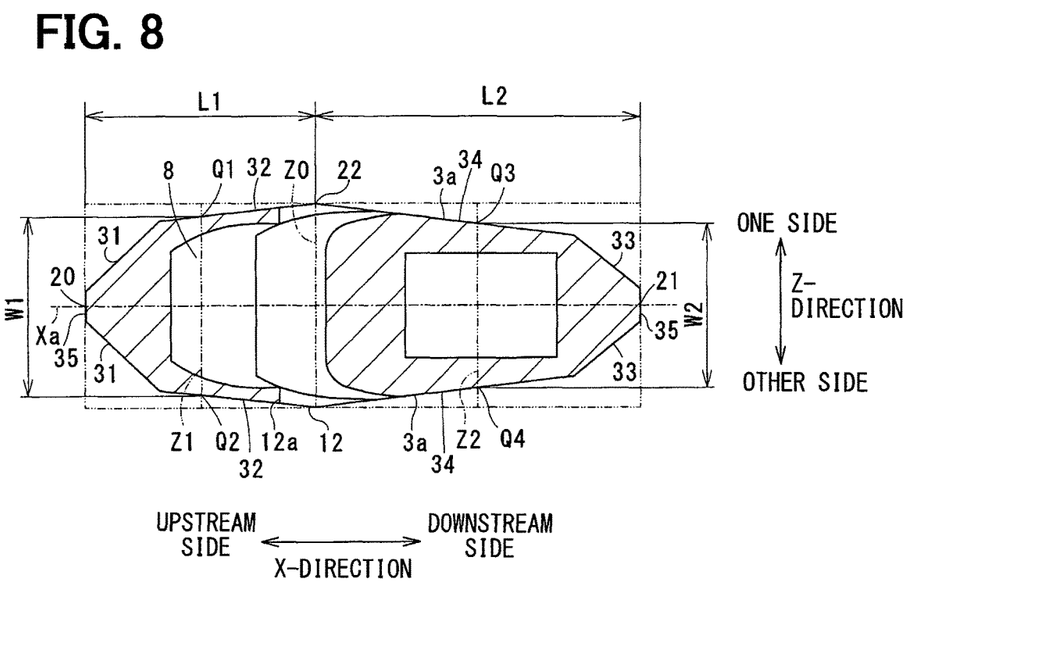
FIG. 8 is the cross-sectional diagram illustrating the flow measurement device according to the second embodiment.

Points of a second embodiment different from a first embodiment will be mainly described referring to FIGS. 7 and 8. Same reference numerals as the first embodiment represent the same elements, and preceding descriptions will be referred. In the present embodiment, an outline of a cross-section of a housing 3 perpendicular to a Y-direction is formed of a plurality of continuous straight lines. In other words, both an outer wall 3a of the housing 3, along which a main flow flows on one side in a Z-direction, and an outer wall 3a, along which the main flow flows on the other side in the Z-direction, are defined by the plurality of lines inclined with respect to an imaginary line Xa.

The outline of the cross-section in an upstream area is formed of a straight line 31 and a straight line 32. The straight line 31 extends from an upstream side end 20 and is inclined with respect to the imaginary line Xa at an incline angle d1. The straight line 32 is connected to an end of the straight line 31 opposite from the upstream side end 20 and inclined with respect to the imaginary line Xa at an incline angle d2. The incline angle d1 is larger than the incline angle d2. The outline of the cross-section in a downstream area is formed of a straight line 33 and a straight line 34. The straight line 33 extends from a downstream side end 21 and is inclined with respect to the imaginary line Xa at an incline angle d3. The straight line 34 is connected to an end of the straight line 33 opposite from the downstream side end 21 and inclined with respect to the imaginary line Xa at an incline angle d4. The incline angle d3 is larger than the incline angle d4.

A position where the straight line 34 and the straight line 32 intersect with each other is a widest portion 22. The incline angles of the straight lines decrease with a decrease in a distance from the widest portion 22. That is, the incline angles d1, d1 of the straight lines 31, 31 are greater than the incline angles d2, d2 of the straight lines 32, 32. Similarly, the incline angles d3, d3 of the straight lines 33, 33 are greater than the incline angles d4, d4 of the straight lines 34, 34.

Also in the present embodiment, as with the first embodiment, W1>W2 and W1/L1>W2/L2. In the cross-section, a distance L2 in an X-direction between the downstream side end 21 and the widest portion 22 is larger than a distance L1 in the X-direction between the upstream side end 20 and the widest portion 22. An upstream end 12a of an outlet 12 is located upstream of the widest portion 22 in the X-direction. Accordingly, the same effects as the first embodiment can be obtained.

A corner portion at which the straight lines intersects with each other may be chamfered or have a round shape. A corner of the upstream side end 20 and a corner of the downstream side end 21 may be cut off so that the housing 3 includes a plane 35 perpendicular to the X-direction.

Although the present disclosure has been fully described in connection with the preferred embodiments thereof with reference to the accompanying drawings, it is to be noted that various changes and modifications will become apparent to those skilled in the art.

In the above-described embodiments, the bypass passage 8 is defined by the inner passage 11 including the circulation passage 14, but the bypass passage 8 is not limited to this. The bypass passage 8 may be provided along the direction of the main flow. The bypass passage 8 may guide the air, which is introduced from the inlet 10, along a normal flow in the direction of the main flow, and subsequently, the bypass passage 8 discharges the air from the outlet 12.

In the above-described embodiments, the cross-section perpendicular to the Y-direction taken at the position of the outlet 12 is symmetrical about the imaginary line Xa, but the cross-section may not be symmetrical. However, the cross-section is preferred to be symmetrical in terms of the limitation of occurrence of the separation and the eddy. It is because the symmetrical cross-section may limit an occurrence of differences of flow rate and pressure, and the flow around the housing 3 may become stable.

In the above-described embodiments, the length L2 is larger than the length L1, but the length L2 may be equal to the length L1.

In the above-described embodiments, the housing 3 of the flow rate measuring device 1 protrudes into the inside of the duct D from the outside of the duct D through the attachment hole Da. However, the flow rate measuring device 1 may be attached to an inner wall of the duct D. In this case, the attachment hole Da may be eliminated.

Additional advantages and modifications will readily occur to those skilled in the art. The disclosure in its broader terms is therefore not limited to the specific details, representative apparatus, and illustrative examples shown and described.

What is claimed is:

1. A flow rate measuring device comprising:
a housing disposed in a duct to protrude into an inside of the duct from an outside of the duct through which an air as a measuring target flows, the housing defining a bypass passage therein to take in a portion of the air flowing in the duct, an outlet of the bypass passage being open at an outer wall of the housing; and
a flow rate sensor disposed in the bypass passage, the flow rate sensor including a heating element and a thermo-sensitive element, wherein
a direction in which the air flows in the duct is defined as an X-direction, a direction in which the housing protrudes is defined as a Y-direction,
a direction perpendicular to both the X-direction and the Y-direction is defined as a Z-direction,
the housing has a cross-section that is perpendicular to the Y-direction and that is taken at a position of the outlet, the cross-section including a widest portion, between an upstream side end and a downstream side end, having a maximum width along the Z-direction, the cross-section having a width along the Z-direction gradually decreasing from the widest portion toward the upstream side end and having a width along the Z-direction gradually decreasing from the widest portion toward the downstream side end,
a width of the housing along the Z-direction at a middle position of the housing between the widest portion and the upstream side end in the X-direction is defined as a width W1,
a width of the housing along the Z-direction at a middle position of the housing between the widest portion and the downstream side end in the X-direction is defined as a width W2,
a length of the housing along the X-direction between the widest portion and the upstream side end is defined as a length L1, and
a length of the housing along the X-direction between the widest portion and the downstream side end is defined as a length L2, wherein
W1>W2 and W1/L1>W2/L2,
the bypass passage includes an intake passage that extends from an inlet of the bypass passage,
the intake passage branches into a circulation passage and a dust discharge passage,
the circulation passage extends along the Y-direction from the intake passage,
the dust discharge passage extends along the X-direction from the intake passage, and
an outlet of the circulation passage is open at the widest portion and faces in the Z-direction.

2. The flow rate measuring device according to claim 1, wherein L2>L1.

3. The flow rate measuring device according to claim 1, wherein
an upstream end of the outlet of the circulation passage is located upstream of the widest portion in the X-direction.

4. The flow rate measuring device according to claim 1, wherein
the cross-section is symmetrical about an imaginary line perpendicular to the Z-direction.

5. The flow rate measuring device according to claim 1, wherein
in the cross-section, the outer wall located on one side in the Z-direction and the outer wall located on an other side in the Z-direction intersect with each other at the downstream side end.

6. The flow rate measuring device according to claim 1, wherein
the downstream side end is located on an imaginary line that is a center line of the cross-section extending along the X-direction.

7. The flow rate measuring device according to claim 1, wherein
the outlet of the circulation passage is parallel to the X-direction.

8. The flow rate measuring device according to claim 1, wherein
an upstream end of the circulation passage overlaps a downstream end of the circulation passage in the X-direction.

9. The flow rate measuring device according to claim 1, wherein
an outline of a cross-section of the housing, which is perpendicular to the Y-direction and taken at a position of the outlet of the circulation passage, is a same shape as an outline of another cross-section of the housing, which is perpendicular to the Y-direction and does not include the outlet of the circulation passage.

10. The flow rate measuring device according to claim 1, wherein
the outlet of the circulation passage is open at the widest portion and faces in the Z-direction without any object on an outside of the outlet in the Z-direction.

11. A flow rate measuring device comprising:
a housing disposed in a duct to protrude into an inside of the duct from an outside of the duct through which an air as a measuring target flows, the housing defining a bypass passage therein to take in a portion of the air flowing in the duct, an outlet of the bypass passage being open at an outer wall of the housing; and
a flow rate sensor disposed in the bypass passage, wherein
a direction in which the air flows in the duct is defined as an X-direction,
a direction in which the housing protrudes is defined as a Y-direction,
a direction perpendicular to both the X-direction and the Y-direction is defined as a Z-direction,
the housing has a cross-section that is perpendicular to the Y-direction and that is taken at a position of the outlet, the cross-section including a widest portion, between an upstream side end and a downstream side end, having a maximum width along the Z-direction, the cross-section having a width along the Z-direction gradually decreasing from the widest portion toward the upstream side end and having a width along the Z-direction gradually decreasing from the widest portion toward the downstream side end,
a width of the housing along the Z-direction at a middle position of the housing between the widest portion and the upstream side end in the X-direction is defined as a width W1,
a width of the housing along the Z-direction at a middle position of the housing between the widest portion and the downstream side end in the X-direction is defined as a width W2,
a length of the housing along the X-direction between the widest portion and the upstream side end is defined as a length L1, and
a length of the housing along the X-direction between the widest portion and the downstream side end is defined as a length L2, wherein
W1>W2 and W1/L1 >W2/L2,
in a projected view of the housing in the Y-direction, an outline of the housing is continuous,
an outline of the cross-section is a same shape as an outline of another cross-section of the housing, which is perpendicular to the Y-direction and does not include the outlet of the bypass passage, and
the outlet of the bypass passage is open at the widest portion and faces in the Z-direction.

12. A flow rate measuring device comprising:
a housing disposed in a duct to protrude into an inside of the duct from an outside of the duct through which an air as a measuring target flows, the housing protruding through an attachment hole of the duct, the housing defining a bypass passage therein to take in a portion of the air flowing in the duct, an outlet of the bypass passage being open at an outer wall of the housing; and a flow rate sensor disposed in the bypass passage, the flow rate sensor including a heating element and a thermo-sensitive element, wherein a direction in which the air flows in the duct is defined as an X-direction, a direction in which the housing protrudes is defined as a Y-direction, a direction perpendicular to both the X-direction and the Y-direction is defined as a Z-direction, the housing has a cross-section that is perpendicular to the Y-direction and that is taken at a position of the outlet, the cross-section including a widest portion, between an upstream side end and a downstream side end, having a maximum width along the Z-direction, the cross-section having a width along the Z-direction gradually decreasing from the widest portion toward the upstream side end and having a width along the Z-direction gradually decreasing from the widest portion toward the downstream side end, a width of the housing along the Z-direction at a middle position of the housing between the widest portion and the upstream side end in the X-direction is defined as a width $W1$, a width of the housing along the Z-direction at a middle position of the housing between the widest portion and the downstream side end in the X-direction is defined as a width $W2$, a length of the housing along the X-direction between the widest portion and the upstream side end is defined as a length $L1$, and a length of the housing along the X-direction between the widest portion and the downstream side end is defined as a length $L2$, wherein $W1 > W2$ and $W1/L1 > W2/L2$, the bypass passage includes an intake passage that extends from an inlet of the bypass passage, the intake passage branches into a circulation passage and a dust discharge passage, the circulation passage extends along the Y-direction from the intake passage, and the dust discharge passage extends along the X-direction from the intake passage, a center of an outlet of the dust discharge passage is at a position farther away from the attachment hole in the Y-direction than a center of the inlet of the bypass passage is from the attachment hole, the circulation passage has a most downstream end located most downstream in the circulation passage with respect to an air flow in the circulation passage, an outlet of the circulation passage is open at the most downstream end of the circulation passage, the outlet of the circulation passage includes a downstream end in the X-direction that is located downstream of the widest portion in the X-direction, the housing includes a guiding wall that partially defines the circulation passage, and the guiding wall extends to be continuously connected to the downstream end of the outlet and guides the air toward a downstream side of the X-direction.

* * * * *